H. FOSTER.
STORM FRONT FOR WAGONS.
APPLICATION FILED FEB. 8, 1909.
939,998.
Patented Nov. 16, 1909.
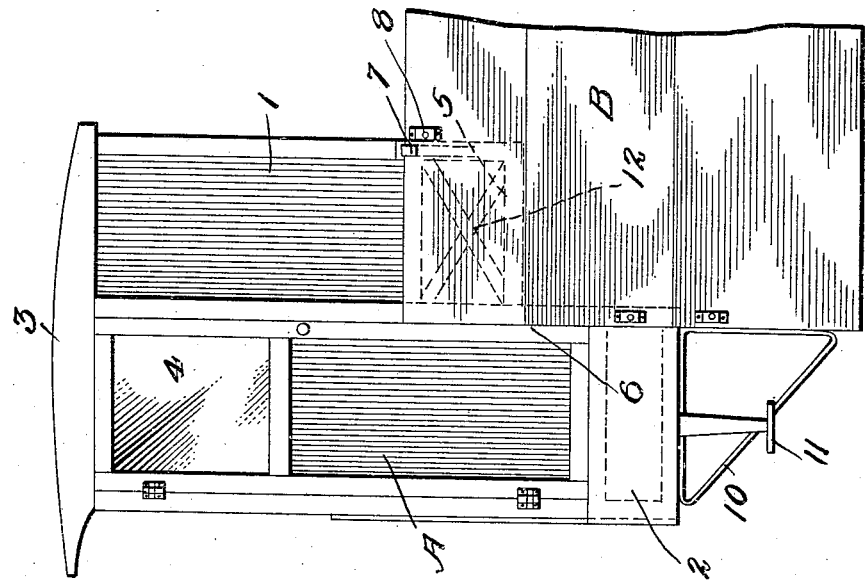
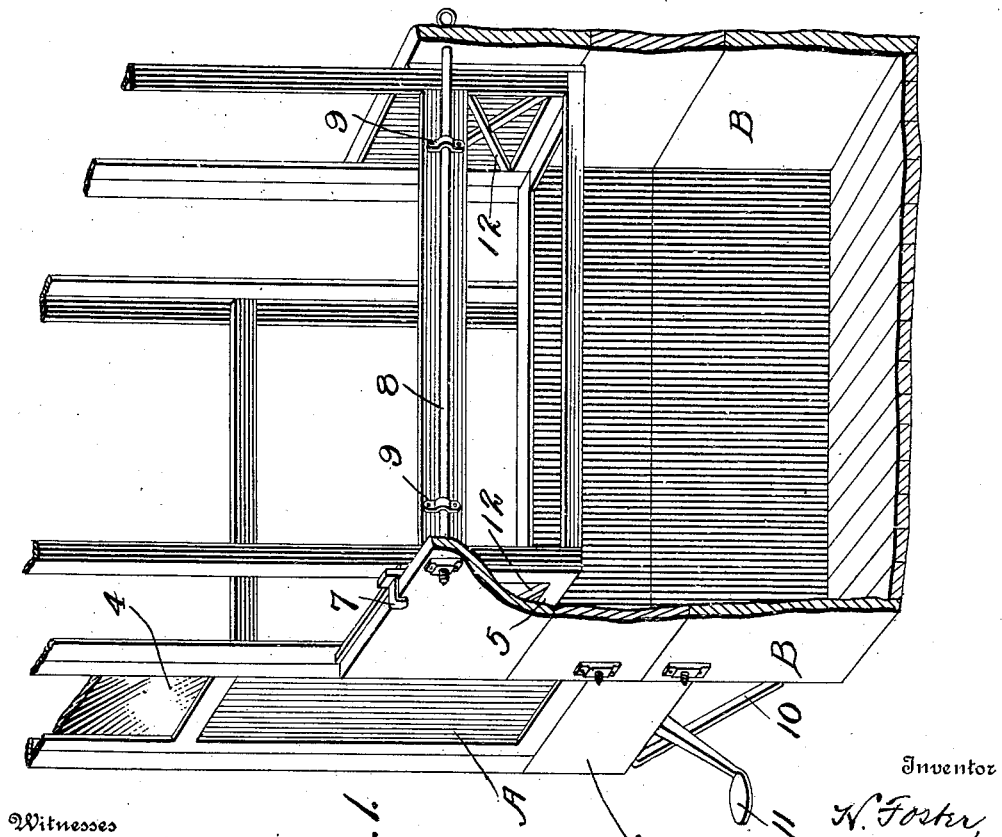

UNITED STATES PATENT OFFICE.

HERMAN FOSTER, OF WOLCOTT, INDIANA.

STORM-FRONT FOR WAGONS.

939,998.  Specification of Letters Patent.  Patented Nov. 16, 1909.

Application filed February 8, 1909. Serial No. 476,615.

*To all whom it may concern:*

Be it known that I, HERMAN FOSTER, a citizen of the United States, residing at Wolcott, in the county of White and State of Indiana, have invented certain new and useful Improvements in Storm-Fronts for Wagons, of which the following is a specification.

This invention consists of a novel construction of storm front for farm wagons, and similar vehicles.

The invention is peculiarly constructed to facilitate ready attachment and removal thereof from a wagon, special securing means being employed for the above purpose.

It is contemplated that the storm front be used in cold or stormy weather to protect the driver of the vehicle.

For a full understanding of the invention, reference is to be had to the following detail description and to the accompanying drawings, in which—

Figure 1 is a side elevation of the invention shown on the body of an ordinary farm wagon, and Fig. 2 is a perspective view, parts broken away, bringing out more clearly the construction of the frame-work of the storm front and the manner of attachment thereof to the wagon body.

Throughout the following detail description and on the several figures of the drawings similar parts are referred to by like reference characters.

Specifically describing the invention, and referring particularly to the drawings, A indicates the body of the storm front, and B the wagon body.

The invention consists of a housing which for the purposes of this description will be described as comprising a rear portion or seat section 1 and the front portion or entrance section 2, these sections embodying a specially constructed and reinforced framework to which the panels, comprising the sides, back, and front of the device, are secured. The storm front is provided with a suitable top 3 and at one or both sides of the entrance section 2 will be provided a suitable door 4. The base or bottom of the seat section 1 provides a seat 5 upon which the driver of the vehicle may sit, and the front section 2 extends some distance below the seat section 1 providing an angle 6 at the rear lower portion of the construction, whereby the rear of the storm front is adapted to engage over and be secured rigidly to the wagon body B. As a matter of fact the seat section 1 rests upon the front end gate of the wagon body and the lower portion of this section extends rearwardly between the sides of said wagon body, as shown most clearly in Fig. 2.

To attach the storm front in a substantial manner to the wagon body it is contemplated to provide hooks 7 at opposite sides of the rear portion 1, said hooks engaging over the opposite sides of the wagon body B and preventing likelihood of backward tipping of the attachment. Displacement of the invention is also prevented by means of a detachable rod 8 which passes through openings in the opposite sides of the wagon body B and engages beneath connecting plates 9 which are attached in any suitable manner to the rear side of the seat section.

Not only is the rear portion of the storm front supported firmly between the sides of the wagon body B but it will be observed that brackets 10 are attached to the outer side of the front end gate of the wagon body and the face of the entrance portion 2 rests upon said brackets. A step 11 is preferably secured to the lower end of the front portion 2 of the device to facilitate entrance and descent of the driver as he passes into and out of the body A.

The upper front portion of the entrance section 2 of the storm front will preferably be provided with panels to receive glass and permit the driver to have a free view ahead when seated.

The lower end portion of the seat section 1 is reinforced by braces 12 in a manner which will be readily apparent.

The invention may be constructed of wood, metal, or any suitable combination of materials desirable from the standpoint of manufacture, and the ease with which the storm front may be placed in position or removed from the wagon body is an especially advantageous feature of construction.

Having thus described the invention, what is claimed as new is:

1. In combination with a wagon body, comprising spaced sides, a detachable storm front therefor comprising a top, and a body consisting of a rear seat portion extending over the front end of the wagon body into the space between its sides, and a front entrance portion projecting below the seat portion and on the out side of the front end of the wagon body, a door on the entrance portion, supporting members on the seat section engaging the sides, a transverse support passing through opposite sides of the wagon body and detachably connected with the rear seat portion to prevent displacement of the storm front, and bracket supports on the front of the wagon body engaging the base of said entrance portion.

2. In combination with a wagon body comprising a front end gate and opposite sides extending above said end gate, a storm front detachably mounted on the wagon body and consisting of a top, a rear seat section, and a front entrance section extending at its lower end below the seat section, the seat section being arranged so as to extend over the front end gate and between the sides of the wagon body, hooks extending from opposite sides of the seat sections and engaging over the sides of the wagon body, a detachable rod passing through the sides of the wagon body and detachably connected with the rear side of the seat section, and supporting brackets projecting from the front end gate beneath and supporting the entrance section.

In testimony whereof I affix my signature in presence of two witnesses.

HERMAN FOSTER.

Witnesses:
R. P. MILLER,
F. C. FOLSOM.